(12) United States Patent
Wahl

(10) Patent No.: US 6,522,657 B1
(45) Date of Patent: Feb. 18, 2003

(54) METHOD OF ASSIGNING TIME SLOTS, AS WELL AS SYSTEM, CENTER, AND SUBSCRIBER FACILITY FOR CARRYING OUT THIS METHOD

(75) Inventor: Stefan Wahl, Schwieberdingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/115,989

(22) Filed: Jul. 15, 1998

(30) Foreign Application Priority Data

Jul. 17, 1997 (DE) ......................................... 197 30 623

(51) Int. Cl.⁷ ................................................. H04J 4/00
(52) U.S. Cl. ........................................ 370/436; 370/458
(58) Field of Search ................................. 370/375, 376, 370/377, 378, 379, 395, 398, 430, 442, 443, 444, 458, 462, 431, 436, 437

(56) References Cited

U.S. PATENT DOCUMENTS

| | | | |
|---|---|---|---|
| 4,809,270 A | | 2/1989 | Baxter et al. |
| 4,815,071 A | * | 3/1989 | Shimizu ...................... 370/352 |
| 5,301,188 A | | 4/1994 | Kotzin et al. |
| 5,572,517 A | * | 11/1996 | Safadi .......................... 370/431 |
| 5,581,548 A | | 12/1996 | Ugland et al. |
| 5,638,374 A | * | 6/1997 | Heath .......................... 370/322 |
| 5,949,769 A | * | 9/1999 | Davidson et al. ............ 370/329 |
| 6,011,786 A | * | 1/2000 | Dent |
| 6,055,242 A | * | 4/2000 | Doshi et al. ................. 370/458 |
| 6,094,429 A | * | 7/2000 | Blanchette et al. .......... 370/347 |

FOREIGN PATENT DOCUMENTS

| | | |
|---|---|---|
| DE | 3515127 | 10/1986 |
| DE | 4335480 | 5/1994 |
| DE | 4425973 | 4/1995 |
| DE | 19543845 | 7/1996 |
| EP | 0446441 | 9/1991 |
| EP | 0691760 | 1/1996 |
| EP | 0758822 | 2/1997 |
| GB | 2306083 | 4/1997 |
| WO | WO79/01089 | 12/1979 |
| WO | 9526592 | 10/1995 |
| WO | 9717778 | 5/1997 |

* cited by examiner

Primary Examiner—Kwang Bin Yao
(74) Attorney, Agent, or Firm—Ware, Fressola, Van Der Sluys & Adolphson

(57) ABSTRACT

A method is disclosed for assigning time slots in a system comprising a plurality of subscriber facilities (NT) connected to a center (HUB) via a common medium, the common medium being divided into a plurality of frequency or wavelength channels which are subdivided into time slots. The center assigns time slots to at least part of the subscriber facilities by specifying one channel and one time-slot number for each assigned time slot. After each time slot used, each subscriber facility involved changes to the next allocated channel. Each subscriber facility involved sends information in the time slot with the next assigned time-slot number. Also disclosed are a system, a center, and a subscriber facility for carrying out this method.

13 Claims, 2 Drawing Sheets

METHOD OF ASSIGNING TIME SLOTS, AS WELL AS SYSTEM, CENTER, AND SUBSCRIBER FACILITY FOR CARRYING OUT THIS METHOD

TECHNICAL FIELD

This invention relates to a method of assigning time slots in a system comprising a plurality of subscriber facilities connected to a center via a common medium, the common medium being divided into a plurality of frequency or wavelength channels which are subdivided into time slots, as It is also directed to a system as a center as and to a subscriber facility associated with such a method.

BACKGROUND OF THE INVENTION

In all systems with multiple access to a common medium, the question arises how to control the access to this medium. In radio transmission over the medium "airwaves", for example, the medium is apportioned by international agreements and frequency allocations based thereon. For some other media, too, such as fiber-optic and coaxial-cable networks, fixed allocations have been made. However, at least part of the total capacity must be assigned on demand.

For such cases, it is common practice to assign time slots for the duration of one call. For a variable traffic volume or for a constant traffic volume in an asynchronous environment, it is also common practice to assign to each call a channel within which the respective time slots to be used are then determined by some kind of mechanism.

In assigning a channel to a call, the respective parameters of the calls already assigned to this channel have to be taken into account. It may be necessary to first switch other calls to another channel before a channel has sufficient residual capacity for the new call. Still, an at least short-time bottleneck may occur in a channel due to variations in the traffic volume of the individual calls, while at other times, the same channel is only slightly loaded.

SUMMARY OF THE INVENTION

The object of the invention is to manage the capacity of the channels more effectively.

According to the invention, this object is attained by a method of assigning time slots in a system comprising a plurality of subscriber facilities connected to a center via a common medium, the common medium being divided into a plurality of frequency or wavelength channels which are subdivided into time slots, wherein the center assigns time slots to at least part of the subscriber facilities by specifying one channel and one time-slot number for each assigned time slot, that after each time slot used, each subscriber facility involved changes to the next assigned channel, and that each subscriber facility involved sends information in the time slot with the next assigned time-slot number.

The object is also attained by a system comprising a plurality of subscriber facilities connected to a center via a common medium, the common medium being divided into a plurality of frequency or wavelength channels which are subdivided into time slots, wherein the center comprises means for assigning time slots to the subscriber facilities by specifying one channel and one time-slot number for each assigned time slot, and that at least part of the subscriber facilities comprise means for changing to the next assigned channel after each time slot used and for sending information in the time slot with the next assigned time-slot number.

The object is further attained by a center for a system comprising a plurality of subscriber facilities connected to the center via a common medium, the common medium being divided into a plurality of frequency or wavelength channels which are subdivided into time slots, wherein the center comprises means for assigning time slots to the subscriber facilities by specifying one channel and one time-slot number for each assigned time slot.

The object is still further attained by a subscriber facility for a system comprising a plurality of subscriber facilities connected to a center via a common medium, the common medium being divided into a plurality of frequency or wavelength channels which are subdivided into time slots, wherein the subscriber facility comprises means for changing to the next assigned channel after each time slot used and for sending information in the time slot with the next assigned time-slot number.

Thus, all time slots in all channels are used as a common pool. Each time slot is assigned together with a channel allocation.

Further advantageous features of the invention will become apparent from the following description.

BRIEF DESCRIPTION OF THE DRAWING

The invention will now be explained in more detail with reference to the accompanying drawings, in which.

BEST MODE FOR CARRYING OUT THE INVENTION

Figure 1:
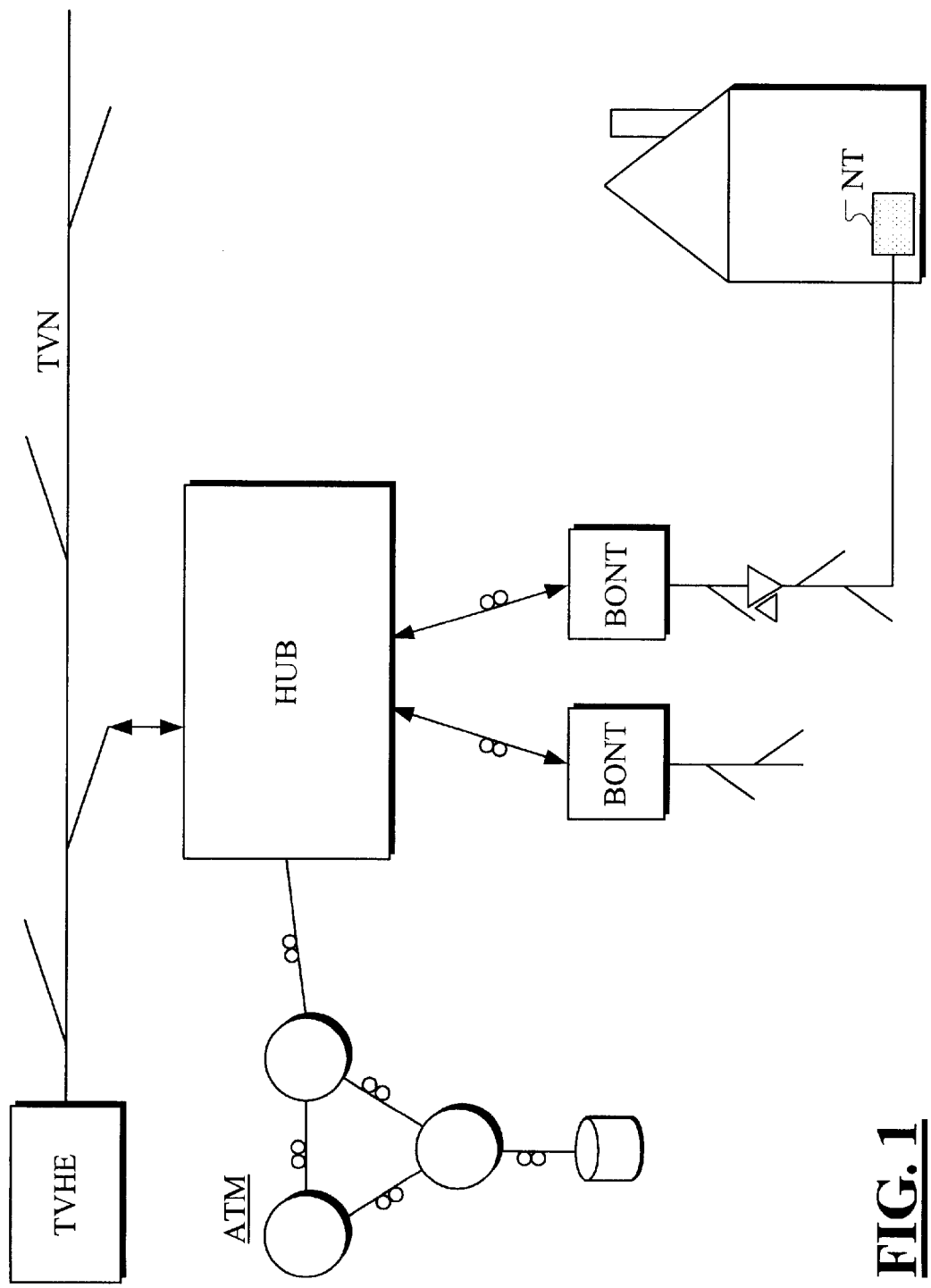
FIG. 1 shows a major access system for cable television and ATM comprising systems, centers, and subscriber facilities according to the invention for carrying out the method according to the invention.

First, the environment in which the method according to the invention is used will be described with the aid of FIG. 1.

The starting point is a television cable distribution network TVN with a head end TVHE. At least part of the subscribers connected to this network are to be additionally connected to an ATM network ATM. The ATM network ATM is shown here by three interconnected exchanges and a database.

To connect subscribers to both the cable distribution network and the ATM network, a center according to the invention is provided, which is designated here as HUB, a term commonly used for such a center by experts. To connect subscriber facilities NT to the two networks, a hybrid network is shown in this example. From the center HUB to a distribution unit BONT, an optical fiber is used. From the distribution unit BONT to the subscriber facility NT, a network of branching coaxial cables containing amplifiers for both directions is provided. The term "subscriber facility NT" as used herein means that facility which carries out the part of the method according to the invention at the subscriber end. This is not the subscriber terminal, but a network termination at the subscriber end, possibly also a terminal with a built-in network termination (NT). The distribution unit BONT is the network termination of the broadband optical network.

The center HUB selects the subscriber-selected information from the television cable distribution network TVN, converts it into ATM cells if necessary, and combines it with those ATM cells into a common data stream which are intended for the connected subscribers. In the distribution unit BONT, only conversion between optical and electric signals takes place.

In the direction from the subscribers to the center, basically the same as in the direction from the center to the subscribers takes place. However, the traffic volume in the direction from the center to the subscribers is substantially greater than that in the opposite direction. This is indicated in FIG. 1 by the different sizes of the amplifiers shown in the coaxial cables. The capacity of the transmission equipment is also adapted to this. The cause is that the subscribers retrieve much more information than they feed into the network. Information providers must be connected to the network in another manner, mostly directly to the ATM network.

As regards control, however, the subscribers are equipped differently from the center. In particular, the distribution of the capacity is controlled by the center. This is done by signaling to the subscriber facilities from the center which time slots they may use in which channels. How this is accomplished in accordance with the invention will now be described with the aid of FIG. 2.

In the application underlying the invention, a data stream which has a superframe structure with 18 frames each consisting of two subframes is sent from the center to the subscribers. The first frame FR1 of these 18 frames with its two subframes is shown in the second line of FIG. 2. The structure of these frames is of no importance here; in any case, each frame contains seven ATM cells as payload. In this example, the first ATM cell ATM1 of the first frame FR1 of each superframe is used for the assignment of capacity to the subscriber facilities by the center. This ATM cell ATM1 is shown in greater detail in the third line of FIG. 2.

The ATM cell ATM1, like any ATM cell, has a header and a subsequent payload. The payload is divided here into 12 fields containing 4 bytes each. Each of these fields, such as field F3, is suited for assigning a time slot and the associated channel to a subscriber facility. Due to the very widely differing capacities of the two directions, a total of only just under 8 ATM cells are sent by the subscriber facilities during the time that the center sends an entire superframe. (The transmission speeds of the two directions do not have an integral relationship to each other and are not synchronized). Such an ATM cell ATM1 must therefore contain the assignments for usually 8 ATM cells of the opposite direction; because of the nonintegral relationship, sometimes only 7 assignments are necessary.

In the present example, there is only a very broadband channel from the center to the subscribers. In this channel, the assignment can be made for all channels of the opposite direction in the respective first cell of a superframe. For various reasons, attempts will be made to assign all time slots even if not so many requests have been received. Then, the subscriber facilities to which these time slots are assigned will send respective empty cells. Therefore, the number of assignment fields needed does not change with the traffic volume. By contrast, the number of assignment fields needed is influenced by the number of channels in the opposite direction for which time slots were assigned. In the present example, however, the superframe length is freely selectable and was chosen so that the above-described conditions resulted. The same result would be obtained if not just one ATM cell were used per superframe or if not exactly 8 of 12 fields of these ATM cells were used for the time slot assignment. It is also possible to permanently assign part of the time slots or the time slots for part of the subscriber facilities in advance for at least a given time.

Figure 2:
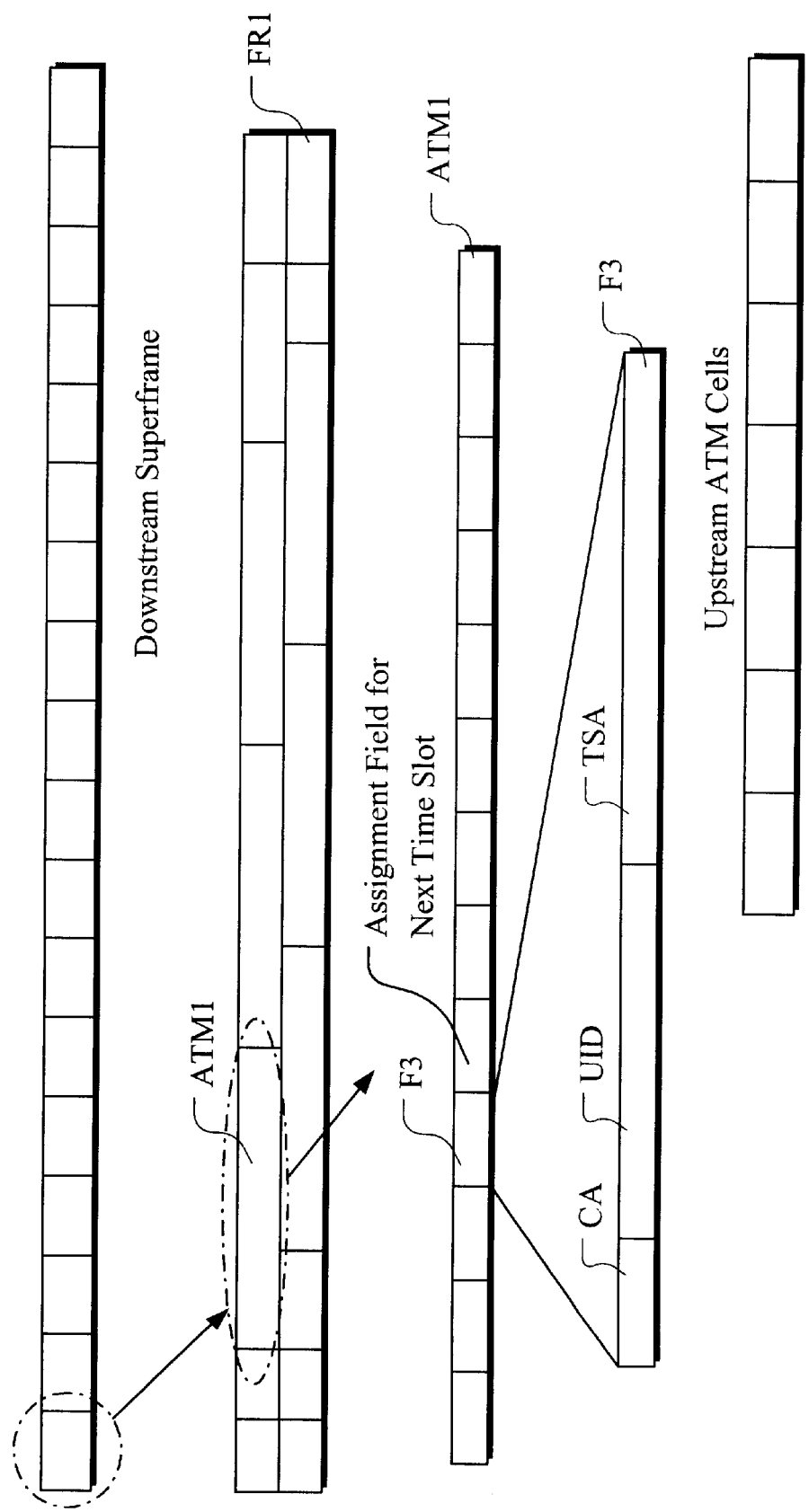
FIG. 2 shows a frame structure for carrying out the method according to the invention.

An assignment field, the field F3, is shown in the third line of FIG. 2. It consists of three subfields, namely one for channel allocation, CA, one for subscriber identification, UID, and one for time-slot assignment, TSA. Thus, a unique assignment is possible for each time slot of all channels from the subscribers to the center.

The subscriber facilities to be used in accordance with the invention must be capable of changing the channel from one time slot to the next. This, however, is no problem in principle. After each time slot is used, the subscriber facility sends information in the time slot and associated channel (CA) specified by the next assigned time-slot number (TSA).

The invention does not touch the questions as to how synchronization is achieved between the various subscriber facilities, how the link is installed, and how the time slots are requested and precisely determined. These are questions which, like many others, also arise with many other solutions and which have been solved in principle. For requesting time slots, for example, a solution that suggests itself is to do this together with the normal useful-signal transmission in the respective assigned time slot of the allocated channel. Instead of requesting the respective time slots, a fixed capacity may be agreed upon, from which the center then determines the current requirements of the subscribers concerned.

What is claimed is:

1. A method of assigning time slots in a system comprising a plurality of subscriber facilities (NT) connected to a center (HUB) via a common medium, the common medium being divided into a plurality of frequency or wavelength channels which are subdivided into time slots, characterized in that:
  the center assigns time slots to at least some of the subscriber facilities by specifying one channel (CA) and one time-slot number (TSA) for each assigned time slot,
  after each time slot is used, each subscriber facility involved changes to a next assigned channel, and
  each subscriber facility involved sends information in the time slot and associated channel (CA) specified by the next assigned time-slot number (TSA).

2. A method as claimed in claim 1, characterized in that if required, a given number of time slots are requested from the center by at least part of the subscribers via the associated subscriber facility.

3. A method as claimed in claim 1, characterized in that at least part of the subscribers are assigned a fixed capacity, and that the center determines therefrom the current requirement of the subscribers concerned.

4. The method of claim 1,
  wherein the center assigns to each of the at least some of the subscriber facilities a number of time slots for oppositely directed upstream communication such that the number of time slots is necessary to satisfy subscriber facility capacity until another assignment by the center occurs,
  wherein the subscriber facility has a capacity for the upstream communication that is less than a downstream communication capacity from the center, and
  wherein an assignment of time slots by the center occurs each time a superframe is sent from the center to each of the at least some of the subscriber facilities.

5. A system comprising a plurality of subscriber facilities (NT) connected to a center (HUB) via a common medium, the common medium being divided into a plurality of frequency or wavelength channels which are subdivided into time slots, characterized in that:

the center comprises means for assigning time slots to the subscriber facilities by specifying one channel (CA) and one time-slot number (TSA) for each assigned time slot, and at least some of the subscriber facilities comprise means for changing to a next assigned channel after each time slot is used, and for sending information in the time slot and associated channel (CA) specified by the next assigned time-slot number (TSA).

6. The system of claim 5 wherein the means for assigning time slots is configured so as to assign to each of the at least some of the subscriber facilities a number of time slots for oppositely directed upstream communication, such that the number of time slots is necessary to satisfy a subscriber facility capacity for the upstream communication until another assignment by the means for assigning time slots occurs, wherein the subscriber facility capacity for the upstream communication is less than downstream communication capacity from the center, and wherein the means for assigning time slots is further configured to assign time slots each time a superframe is sent from the center to each of the at least some of the subscriber facilities.

7. The system of claim 6, wherein the system operates with variable traffic volume.

8. The system of claim 6, wherein the system operates with constant traffic volume in an asynchronous environment.

9. A center (HUB) for a system comprising a plurality of subscriber facilities (NT) connected to the center via a common medium, the common medium being divided into a plurality of frequency or wavelength channels which are subdivided into time slots, characterized in that:

the center comprises means for assigning time slots to the subscriber facilities by specifying one channel (CA) and one time-slot number (TSA) for each assigned time slot, wherein the means for assigning time slots is configured to provide a plurality of assignments in a single cell, the plurality of assignments comprising a plurality of the time slots and a plurality of the channels.

10. The center (HUB) of claim 9, wherein the common medium supports communication from the center to the subscriber facilities and also supports communication in an opposite direction, the opposite direction having an upstream capacity which is less than a downstream capacity from the center to the subscriber facilities, wherein the means for assigning time slots is configured so as to assign to each of the subscriber facilities a number of time slots for communication in the opposite direction, such that the number of time slots is for upstream capacity until another assignment by the means for assigning time slots occurs, and wherein the means for assigning time slots is further configured to assign time slots each time a superframe is sent from the center to each of the subscriber facilities.

11. A subscriber facility (NT) for a system comprising a plurality of subscriber facilities (NT) connected to a center (HUB) via a common medium, the common medium being divided into a plurality of frequency or wavelength channels which are subdivided into time slots, characterized in that:

the subscriber facility comprises means for changing to a next assigned channel (CA) after each time slot is used, and for sending information in the time slot (TSA) and associated channel (CA) specified by the next assigned time-slot number.

12. The subscriber facility of claim 11, wherein the subscriber facility is configured for accepting an assigned number of time slots for communication with the (HUB), such that the number of time slots is necessary to satisfy a subscriber facility upstream capacity until another assignment of time slots.

13. A subscriber facility (NT) for a system comprising a plurality of subscriber facilities (NT) connected to a center (HUB) via a common medium, the common medium being divided into a plurality of frequency or wavelength channels which are subdivided into time slots, characterized in that:

the subscriber facility comprises means for changing to a next assigned channel (CA) after each time slot is used, and means for sending information in the time slot (TSA) and associated channel (CA) specified by the next assigned time-slot number.

* * * * *